(12) United States Patent
Korkin et al.

(10) Patent No.: US 8,912,484 B2
(45) Date of Patent: Dec. 16, 2014

(54) PHOTOMULTIPLER-BASED NEUTRON DETECTOR

(75) Inventors: Roman Korkin, Lawrenceville, NJ (US); Wolfgang Ziegler, Hightstown, NJ (US); Kenneth Stephenson, Plainsboro, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 197 days.

(21) Appl. No.: 13/432,780

(22) Filed: Mar. 28, 2012

(65) Prior Publication Data

US 2013/0256520 A1    Oct. 3, 2013

(51) Int. Cl.
*G01V 5/04* (2006.01)

(52) U.S. Cl.
USPC .......................................... 250/256

(58) Field of Classification Search
USPC .......................................... 250/256
See application file for complete search history.

(56) References Cited

U.S. PATENT DOCUMENTS

| | | | |
|---|---|---|---|
| 7,321,123 B2 * | 1/2008 | Simonetti et al. | 250/370.11 |
| 7,333,701 B1 | 2/2008 | Feller et al. | |
| 7,902,513 B2 | 3/2011 | Kub et al. | |
| 8,319,175 B2 | 11/2012 | Zhou et al. | |
| 2002/0145114 A1 | 10/2002 | Inoue et al. | |
| 2002/0170348 A1 | 11/2002 | Roscoe et al. | |
| 2009/0134337 A1 | 5/2009 | Russ et al. | |
| 2011/0186740 A1 | 8/2011 | Normand et al. | |
| 2012/0314827 A1 * | 12/2012 | Dioszegi et al. | 376/156 |
| 2013/0105679 A1 * | 5/2013 | Climent | 250/269.2 |
| 2013/0299713 A1 | 11/2013 | Stephenson et al. | |

FOREIGN PATENT DOCUMENTS

| | | |
|---|---|---|
| EP | 0749020 B1 | 8/2002 |
| GB | 1455931 | 11/1976 |
| RU | 2064706 C1 | 7/1996 |
| WO | 2009102768 A2 | 8/2009 |

OTHER PUBLICATIONS

International Search Report and Written Opinion for International Application No. PCT/US2013/034061 dated Jul. 11, 2013.
Abbrecia, M. et al., "Resistive plate chambers as detectors for thermal neutrons", Nuclear Instruments and Methods A, vol. 518, No. 1-2, Feb. 1, 2004, pp. 440-442.
Takahashi, K. et al., "Imaging performance of imaging plate neutron detectors", Nuclear Instruments and Methods A, vol. 377, No. 1, Jul. 21, 1996, pp. 119-122.
Abdushukurov, D.A. et al., "Modeling the registration efficiency of thermal neutrons by gadolinium foils", Journal of Instrumentation, vol. 2, Apr. 2007.
Jeavons, et al., "A high resolution proportional chamber positron camera and its applications", IEEE Transitions in Nuclear Science, vol. 25, 1978, pp. 164-173.

(Continued)

*Primary Examiner* — Christine Sung
(74) *Attorney, Agent, or Firm* — Cathy Hewitt

(57) ABSTRACT

A neutron detector is provided which may include a neutron converting layer, and a scintillator layer adjacent the neutron converting layer. The neutron detector may further include a photomultiplier adjacent the scintillator layer. By way of example, the neutron detector may be used in a well logging apparatus to determine a neutron flux incident upon the neutron converting layer, and thereby determine the neutron porosity of a geological formation around a wellbore.

7 Claims, 16 Drawing Sheets

(56) References Cited

OTHER PUBLICATIONS

Jeavons, et al., "A new position-sensitive detector for thermal and epithermal neutrons", Nuclear Instruments and Methods, vol. 148, 1978, pp. 29-33.

Melcart, et al., "The multistep avalanche chamber as a detector for thermal neutrons", Nuclear Instruments and Methods, vol. 186, 1981, pp. 613-620.

Rauch, et al., "Ein neuartiger Detektor für langsame Neutronen", Nuclear Instruments and Methods, vol. 46, No. 1, 1978, pp. 153-156. (English Abstract).

* cited by examiner

PHOTOMULTIPLIER-BASED NEUTRON DETECTOR

TECHNICAL FIELD

This disclosure relates generally to thermal and epithermal neutron detectors, such as those used in the well-logging applications, and related systems and methods.

BACKGROUND

Neutron detectors are used in a variety of different applications. One such application is for well logging tools, in which the characteristics of a subterranean formations are determined by moving the tool along the wellbore of a hydrocarbon (e.g., oil, natural gas, etc.) well. For example, well logging tools may be lowered into a wellbore by "wireline", or in other configurations the tool may be mounted on a drill collar that is lowered into the wellbore along with the drill bit. Such configurations may be referred to as "logging while drilling" (LWD) or "measurement while drilling" (MWD) systems. The neutron detector may be used to determine a porosity of the subterranean formation at various levels, for example. Other applications in which neutron detectors are used include nuclear reactor instrumentation, material sciences, radiation safety equipment, cosmic ray detection, and the detection of nuclear (i.e., radioactive) materials, for example.

One type of neutron detector is based upon Helium-3 (referred to herein as "$^3$He"). It has a high absorption cross section for thermal neutron beams and is used as a converter gas in neutron detectors. The neutron is converted through a nuclear reaction into charged particles triton (T, $^3$H) and proton (p, $^1$H), which are detected.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A neutron detector is provided herein which may include a neutron converting layer, and a scintillator layer adjacent the neutron converting layer. The neutron detector may further include a photomultiplier adjacent the scintillator layer.

A related well-logging apparatus may include a well logging tool to be conveyed within a wellbore of a subterranean formation. The well-logging tool may include a neutron converting layer, a scintillator layer adjacent the neutron converting layer, and a photomultiplier adjacent the scintillator layer. The well-logging apparatus may further include a processor coupled to the well logging tool.

A related neutron detection method may include exposing a neutron converting layer to a neutron source to cause the neutron converting layer to generate charged particles. The method may also include exposing a scintillator layer adjacent the neutron converting layer to the charged particles generated by the neutron converting layer to cause the scintillator layer to generate photons. Furthermore, the method may also include exposing a photomultiplier adjacent the scintillator layer to the photons generated by the scintillator layer to cause the photomultiplier to generate electrical pulses, and determining a neutron flux incident upon the neutron converting layer based upon the electrical pulses.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

Figure 1:
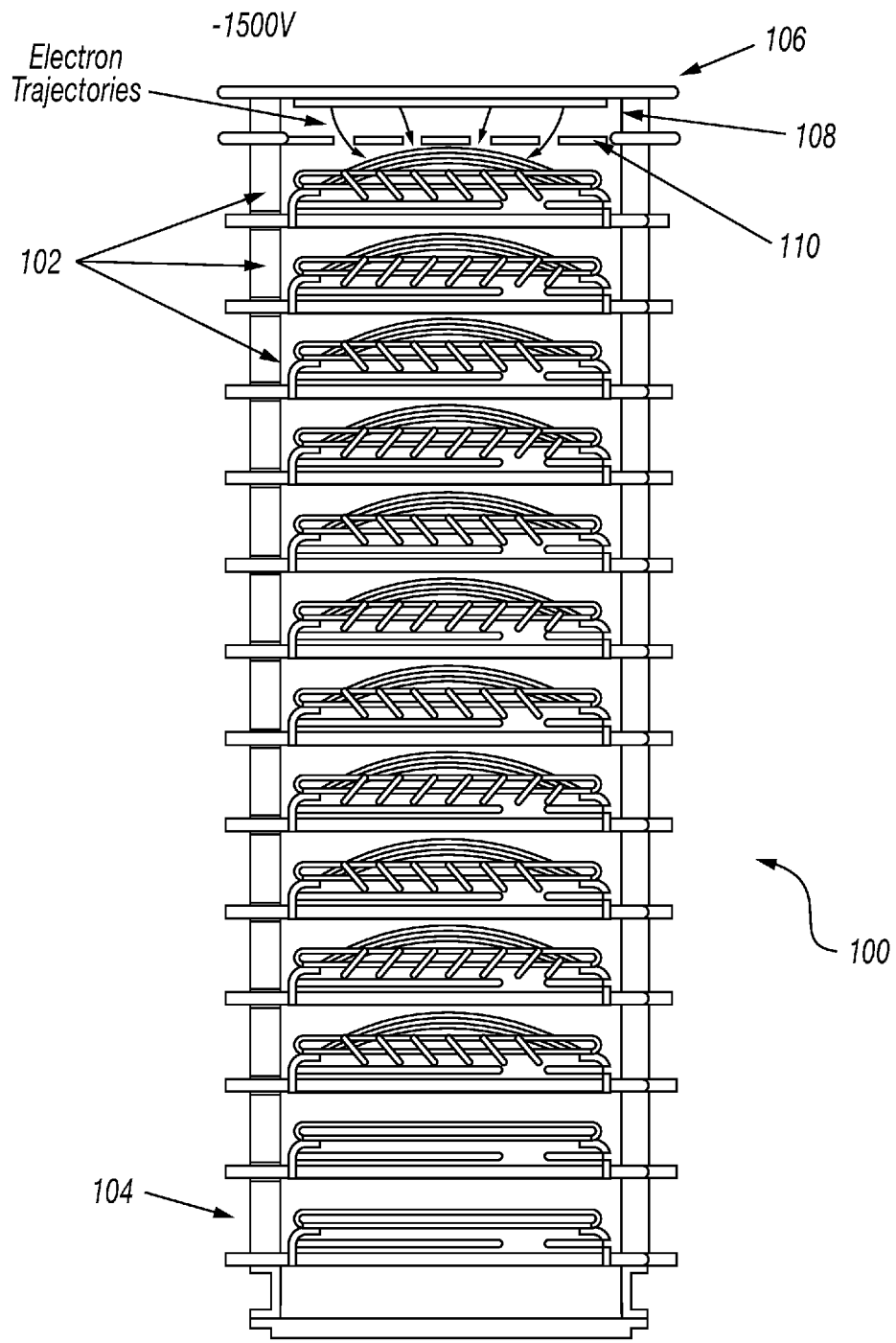
FIG. 1 is a schematic cross-sectional diagram of a multiplier tube neutron detector in accordance with an embodiment of the present disclosure.

Referring now to FIG. 1, in various embodiments, a multiplier tube neutron detector 100 includes a dynode-type electron multiplier having a series of dynodes 102 and an anode 104, a substrate 106 that functions to close the tube and maintain vacuum during operation. Furthermore, neutron-reacting material 108 (e.g., $^{10}$B, $^{6}$Li or Gd) is deposited on the substrate 106 and optionally on an extraction grid 110 to extract low energy electrons from the layer of neutron-reacting material 108. Example neutron-reacting materials include:

$^{6}$Li+n→$^{3}$H+$^{4}$He+4780 keV $\sigma_{therm}$=940 b $^{10}$B+n→$^{7}$Li*+$^{4}$He+2310 keV $\sigma_{therm}$=3840 b $^{155}$Gd→$^{156}$Gd+multiple γ-rays and internal conversion electrons $\sigma_{therm}$=61000 b $^{157}$Gd→$^{158}$Gd+multiple γ-rays and internal conversion electrons $\sigma_{therm}$=255000 b Gd may include natural Gd or isotopically separated $^{157}$Gd. The latter isotope, which may be more expensive than natural Gd, has a thermal neutron capture cross section of 255000 barns, compared to 49000 barns for natural Gd. With respect to the probability of interaction of thermal neutrons in natural Gd and $^{157}$Gd films with subsequent escape of internal conversion electrons in connection with gas-based imaging systems, in natural Gd films of thickness 5 μm, the probability is 0.10 and, for $^{157}$Gd films of thickness 3 μm, the probability is 0.21.

$^{6}$Li metal has a density of 0.45 and therefore has a nucleus density of approximately $4.5 \times 10^{22}$ nuclei/cm$^3$.

Solid $^{10}$B has several crystalline phases with an approximate density of 2.4, leading to a nucleus density of approximately $14.5 \times 10^{22}$ nuclei/cm$^3$. B$_4$C is also a possible material to use, having a boron nucleus density of $11 \times 10^{22}$ nuclei/cm$^3$. Boron has a greater capture cross section and greater nucleus density (of $^{10}$B) in practical materials with respect to lithium. The thickness of boron that will still allow $^4$He particles to escape the surface (and therefore generate detectable electrons) is equal to the range of the emitted 1470 keV $^4$He particles, or 3.3 μm in B$_4$C. In solid $^{10}$B, the range is 3.5 μm. The probability of an interaction for thermal neutrons normally incident on each of these films is 0.14 and 0.19, respectively.

An embodiment of the present disclosure using a thin neutron-reacting film of $^{6}$Li, $^{10}$B, $^{10}$B$_4$C, natural Gd, or $^{157}$Gd is shown in FIG. 1. An extraction grid 110 may optionally be included and biased positively with respect to the neutron-reacting material 108 to accelerate electrons (produced by the charged reaction particles) away from the film and toward the closest dynode in the series of dynodes 102. The extraction grid 110 may provide a uniform and sufficiently strong extraction field at the surface of the neutron-reacting material 108. With respect to the extraction grid 110, the closest dynode (and associated grid) in the series of dynodes 102 is biased positively to ensure that the electrons impact on the closest dynode. The charged particles arriving at the first dynode may be either direct reaction products of the neutron reacting material (e.g., $^3$H, $^4$He, $^7$Li, internal conversion electrons), or may be secondary electrons produced when the direct reaction products pass through the neutron reacting material 108.

In embodiments where an extraction grid is not positioned between the neutron-reacting material and the closest dynode, the closest dynode (and associated grid) is biased positively with respect to the neutron-reacting material 108 to accelerate electrons from the neutron-reacting material 108 toward the dynode. Each successive dynode in the series of dynodes 102 is biased positively with respect to the previous dynode to provide electron multiplication typical of dynode-based electron multipliers. In various embodiments, the neutron-reacting material 108 may be at least slightly conductive so that the electrical potential between the neutron-reacting material 108 and the extraction grid 110 may be maintained.

In various embodiments, each dynode may have a respective grid at the same potential as the dynode. The dynode grid may increase the extraction field thereby enhancing collection of secondary electrons from the previous dynode, and reduce a potential barrier on its own dynode (which would prevent electrons from escaping the dynode if the grid were not there).

The example illustrated in FIG. 1 is a "Venetian blind" electron multiplier structure. Each multiplication stage includes a dynode and a grid. The dynode provides the electron multiplication through secondary electron emission. The grid provides a low electric field region upstream of the dynode, and the grid from the next stage provides a high electric field region downstream of the dynode. These low and high electric fields on each side of the dynode provide the extracting force for the secondary electrons emitted at the dynode surface so that they may leave the dynode and reach the next dynode stage.

The previous material efficiencies are for a flat film of solid neutron-reacting material. The thickness of the neutron-reacting material may correspond with the range of at least one of the reaction products, so that the material will not be "dead" and retain electrons. Higher efficiencies may be realized if the film is made thicker but with an irregular (and larger) surface. For example, higher efficiency may be obtained with a micro-machined array of "posts", each with a diameter corresponding to the neutron-reacting material thicknesses described above, so that the charged particles may escape the post and generate electrons. The length of the posts is selected to result in the detection efficiency desired for the neutron energy of interest. Longer posts may be used for epithermal neutrons since the cross section for capture of epithermal neutrons is smaller than for thermal neutrons.

Figure 2:
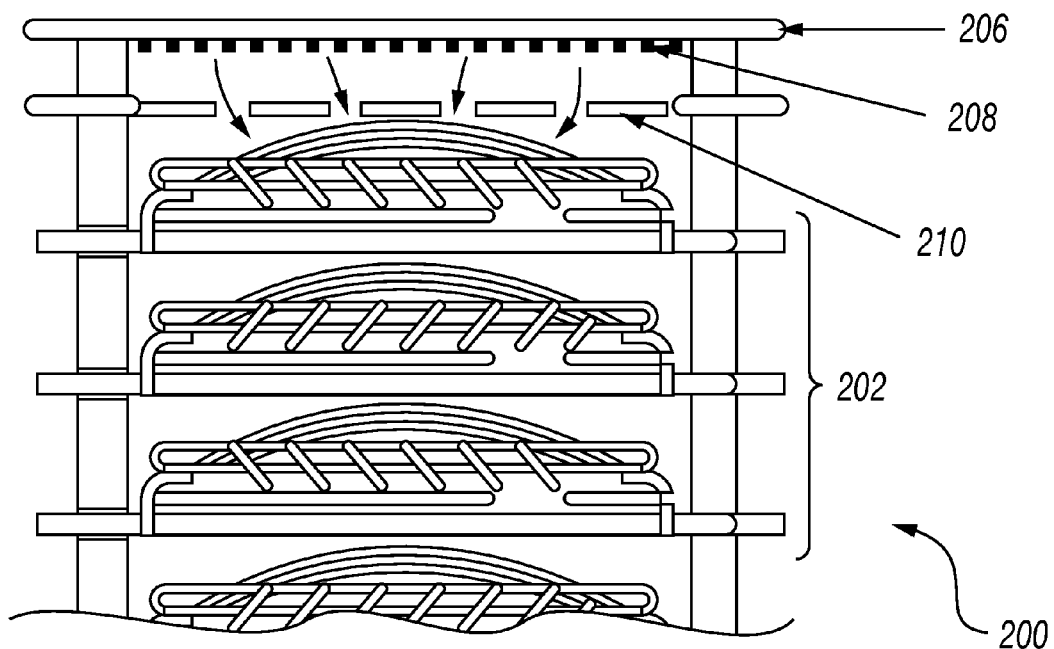
FIG. 2 is a schematic cross-sectional diagram of another multiplier tube neutron detector in accordance with an embodiment of the present disclosure.

Beyond a certain post length, however, electrons produced at the base of the post may not be extracted toward the first (closest) dynode in the series of dynodes. This is due to the weak penetration of electric field between the posts, which are, at least, slightly conductive. An example estimated length range is up to approximately 10 times the diameter of the posts. By utilizing posts rather than a flat film of neutron-reacting material, the volume of neutron-reactive material presented to the incoming neutron flux is larger and the corresponding detection efficiency is larger, especially for epithermal neutrons with smaller cross-section for capture. An illustration of an embodiment utilizing posts rather than a flat film of neutron-reacting material is shown in FIG. 2.

Figure 3:
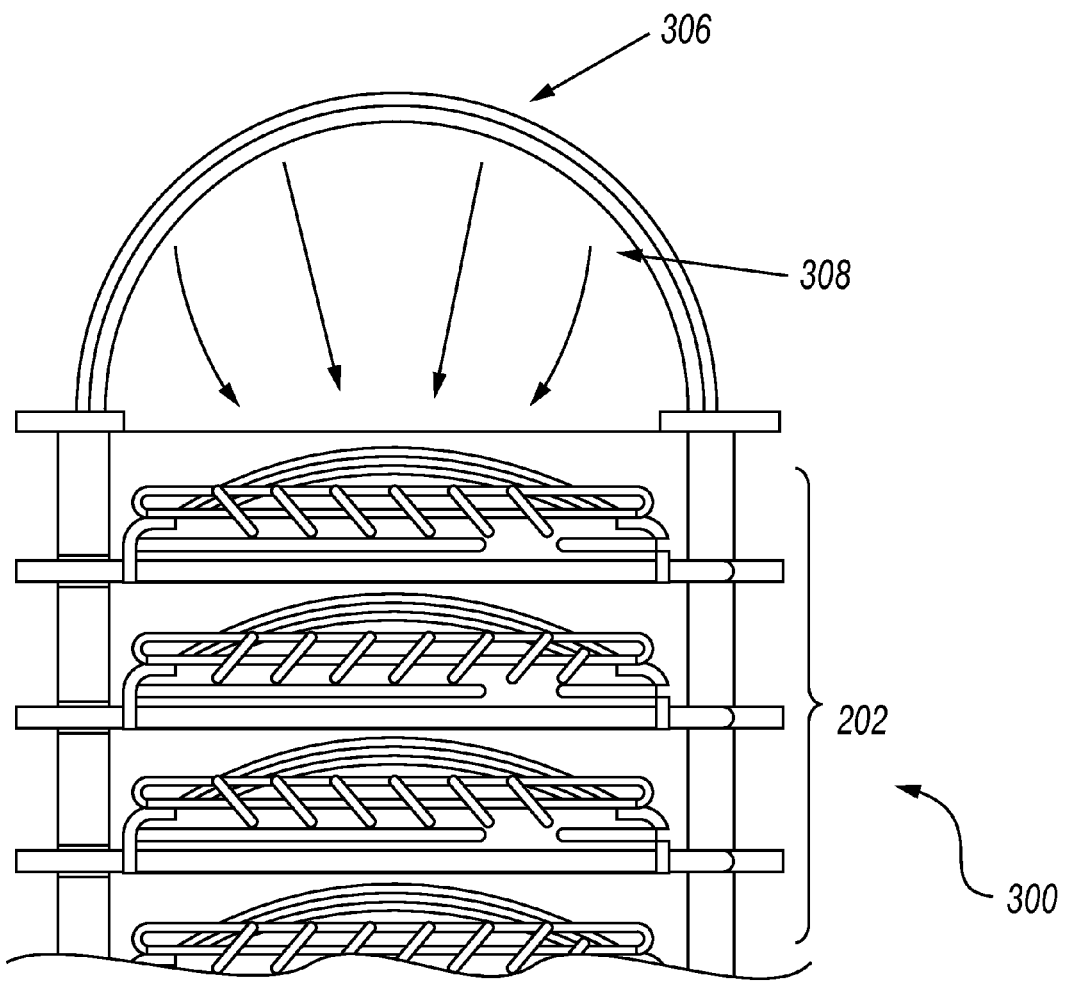
FIG. 3 is a schematic cross-sectional diagram of still another multiplier tube neutron detector in accordance with an embodiment of the present disclosure having a non-flat, hemispherical substrate.

The volume of neutron-reacting material may also be increased by using a non-flat substrate instead of a flat substrate. In this way, the area of the substrate is increased. One example of a non-flat substrate is shown in the embodiment of FIG. 3, in which the substrate 306 is hemispherical (e.g., concave and of a conductive metallic material). The neutron-reacting material 308 may be smooth (i.e., hemispherically curved) or irregular (e.g., having posts no longer than a desired maximum length) as previously discussed, and disposed on the substrate 306. In the embodiment of FIG. 3, the closest dynode in the series of dynodes 302 is biased positively with respect to the neutron-reacting material 308 to extract electrons that are emitted by the neutron-reacting material 308. One characteristic of the hemispherical substrate embodiment is that the electrons are naturally focused to the closest dynode in the series 302, and additional focusing electrodes or grids are not necessarily needed.

Figure 4:
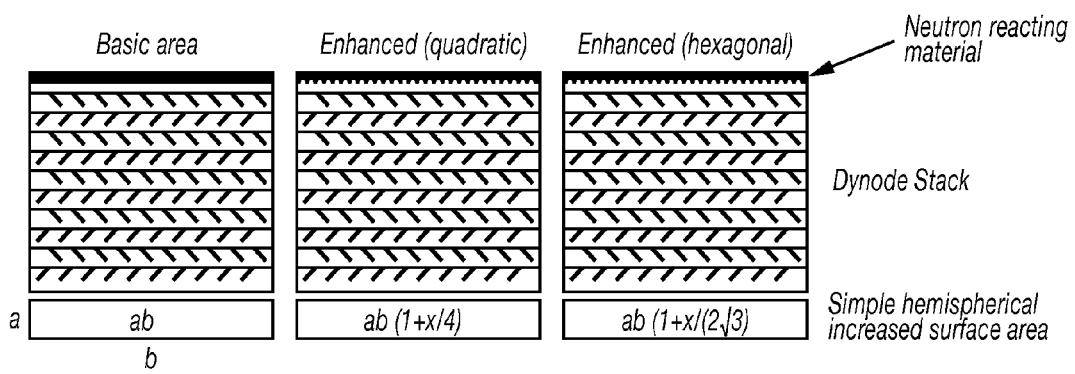
FIG. 4 is grouping of schematic cross-sectional diagrams showing yet another multiplier tube neutron detector in accordance with embodiments of the present disclosure having a flat surface with embedded hemispherical surfaces packed either in a quadratic or hexagonal arrangement.

FIG. 4 shows still another alternative embodiment having a flat substrate surface with embedded hemispherical surfaces packed in a quadratic or a hexagonal arrangement (i.e., a quadratic or hexagonal arrangement as viewed from above). A further configuration is embodied in a substrate with the multiple hemispherical indentations to which a thin coating of neutron-reacting material is applied. The thickness of the neutron-reacting material is chosen, as previously mentioned, so that the range of at least one of the reaction products is larger than the thickness of the neutron-reacting material.

Figure 5:
FIG. 5 is a schematic cross-sectional diagram showing another embodiment of the multiplier tube neutron detector of FIG. 4 and illustrating how the shape may be changed, allowing for deeper indentations.
Figure 6:
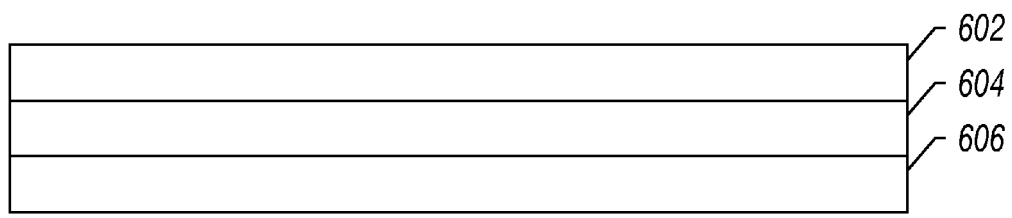
FIG. 6 is a schematic cross-sectional diagram of another embodiment of the multiplier tube neutron detector of FIG. 4 with the application of a potential in the reactive material, by inserting an insulating layer between two layers of conductive neutron reactive materials.
Figure 7:
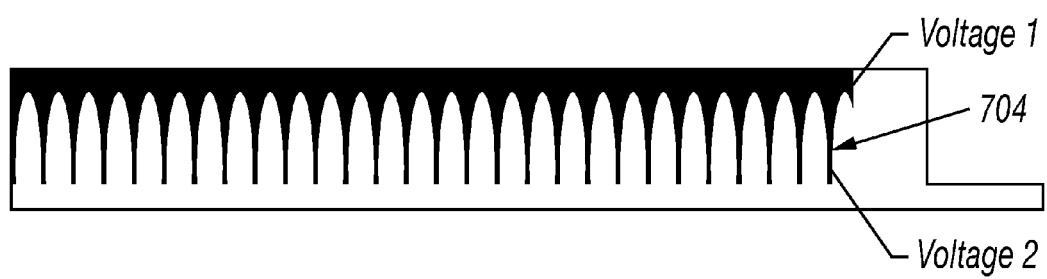
FIG. 7 is a schematic cross-sectional diagram of another embodiment of FIG. 4 with the application of a potential in the reactive material, where a higher positive potential is applied to the conductive layer closer to the top of the structure to enhance the extraction of the electrons from the deep pits.

The shape of an example substrate 500 may be changed to make the indentations or craters deeper (as shown in FIG. 5), thereby increasing the total surface area further. Additional shapes in various embodiments are possible. One issue with the approach of using deep craters in a conductive material is that the electric field may not penetrate deep enough, and some charged particles may not get extracted. Referring to FIG. 6, this issue may be alleviated by applying a potential across the neutron-reacting material by inserting an insulating layer 604 between two layers of conductive neutron reactive materials 600 and 602 respectively. A higher positive potential (shown as Voltage 1) may then be applied to the conductive layer closer to the top of the substrate structure (while a second Voltage 2 is applied on the other conductive layer on the opposite side of insulating layer 704) to enhance the extraction of the electrons from the deep pits formed between posts (referring to FIG. 7). An extracting grid may be optionally positioned in front of the reactive material (not shown in FIG. 7) including a fine mesh coated by reactive material as well. An optional coating may be applied to at least the first dynode (closest to the substrate in the tube) with reactive material. To enhance performance, the indentations or similar shapes may be made in the substrate material, which is then covered by a layer of neutron-reactive material of essentially uniform and desired thickness. If the surface enhancements are made in the bulk of neutron-reactive material, there will be a substantial neutron-reactive volume, which keep the reaction products from escaping to the surface.

The use of a Venetian blind stack for the electron multiplication makes it possible to build a large area detector, since the dynodes may cover a large area and substantially little or no focusing (or "proximity focusing") is needed to accelerate the initial electrons to the first closest dynode. The anode may be made position sensitive by segmenting it or by the use of a position sensitive readout. Other dynode approaches that are known to be suitable for large areas may be considered as well, including box-and-grid, linear-focused, mesh, and micro-machined structures that allow a more compact dynode stack, and thus a thinner detector.

Figure 8A:
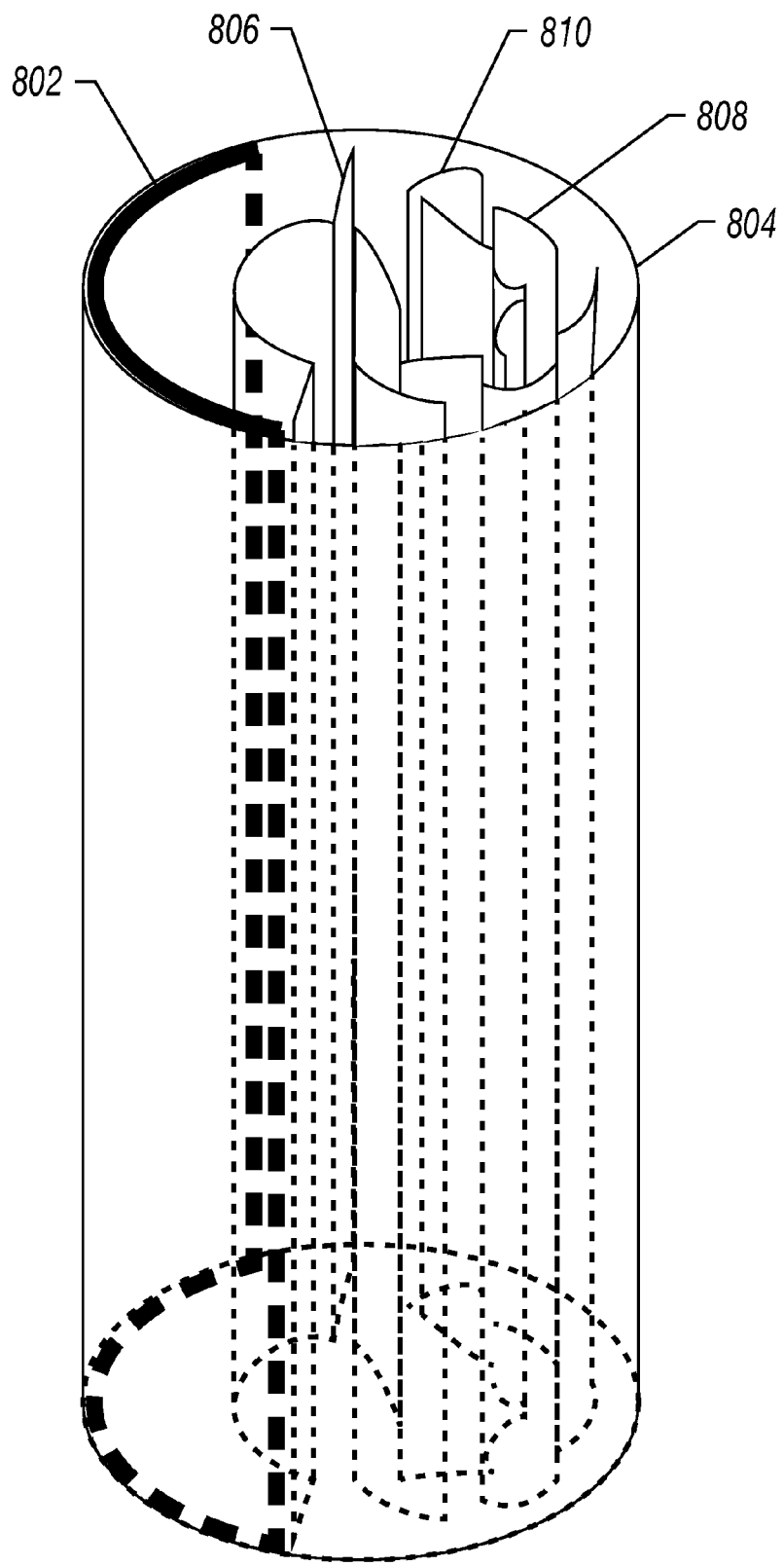
FIGS. 8A-8B include perspective and end views of an alternative embodiment of the multiplier tube neutron detector in which the reactive surface is cylindrical with a "squirrel cage" photomultiplier structure.
Figure 8B:
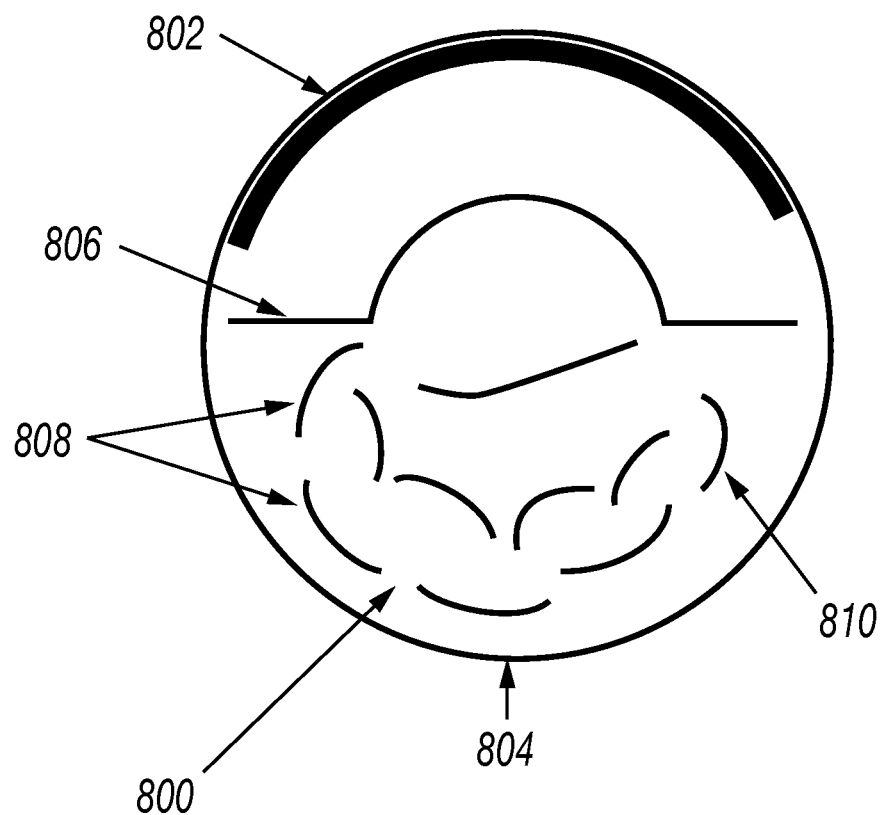

Still another alternative embodiment is shown in FIG. 8, in which the detector 800 includes neutron-reacting material of a semi-cylindrical form surrounded by what is known as a "squirrel cage" photomultiplier structure. As shown in FIG. 8, the neutron-reacting material 802 is deposited on the inside surface of the tube 804. The neutron-reacting material 802 can either be a flat layer or may involve some of the previously described approaches that allow an increased surface area and therefore a larger efficiency for incident neutrons. The neutron-reacting material 802 is disposed in a semi-cylindrical form around the inside of and along the length of the tube 804.

Optionally (as shown in FIG. 8), a focusing electron and grid 806 is disposed between the neutron-reacting material 802 and the series of dynodes 808 configured in a pattern that is circular when viewed from above. As with the Venetian blind style of multiplier disposed above, in this embodiment with a squirrel-cage geometry, charged particles from the neutron-reacting material 802 impinge on the first dynode in the series of dynodes 808, where, in turn, secondary electrons are generated. The secondary electrons are collected by each subsequent dynode in the way that electron multipliers conventionally operate. The charge so collected is amplified in each succeeding dynode stage in a cascade effect, so that a charge pulse is produced at the electron multiplier anode 810 that is much larger than the charge produced by the impact on the first dynode.

Figure 9:
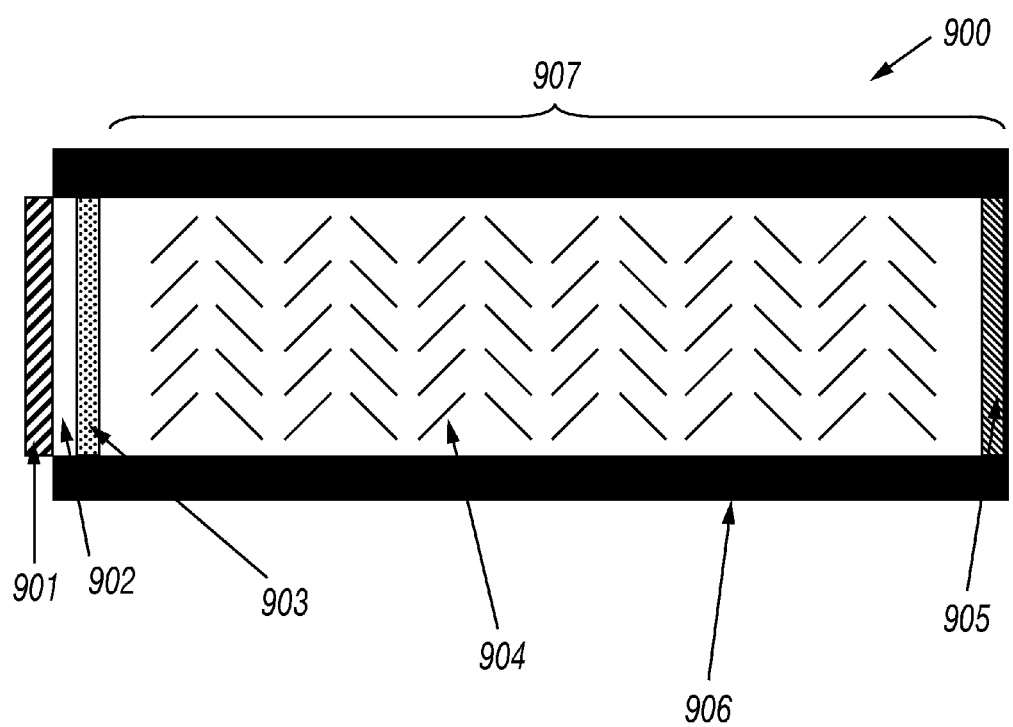
FIG. 9 is a schematic cross-sectional diagram of an alternative embodiment of a neutron detector in accordance with an example embodiment including a scintillator layer and a photocathode.
Figure 10:
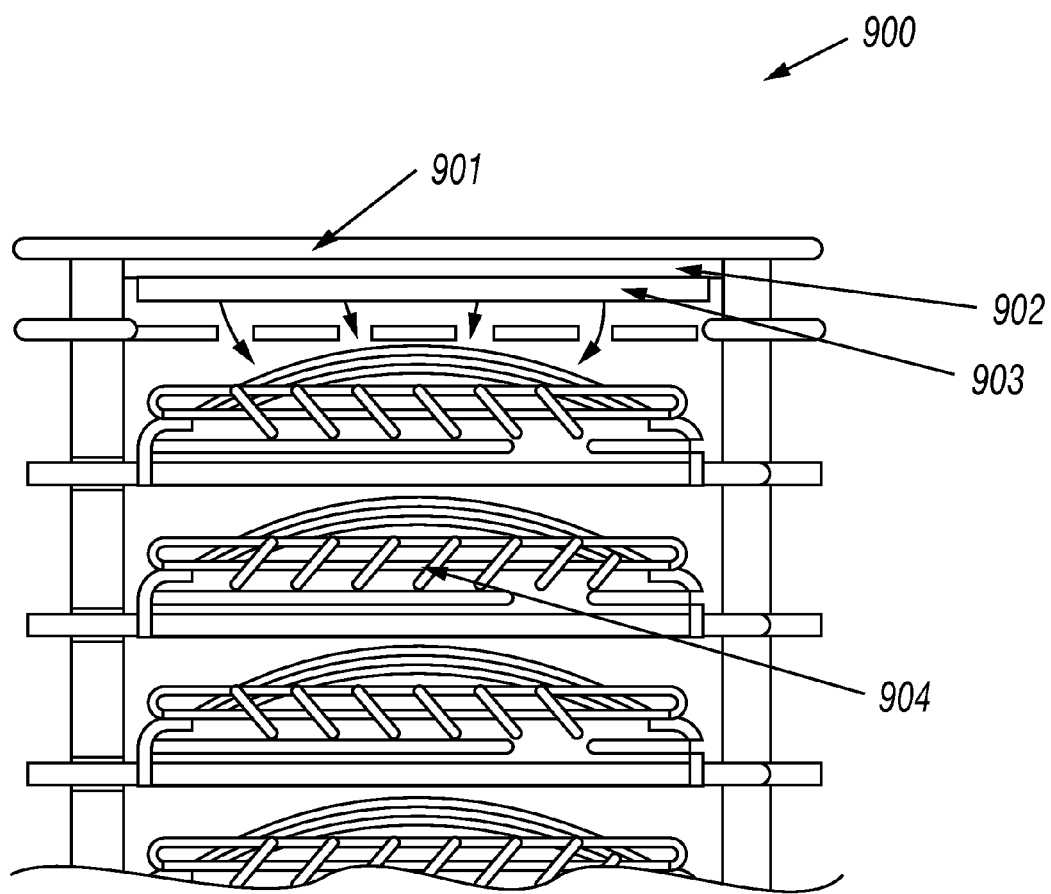
FIG. 10 is a schematic cross-sectional diagram of an embodiment of the neutron detector of FIG. 9 including a neutron converting layer outside the vacuum tube housing of the photomultiplier and providing an entrance window to the photomultiplier.
Figure 14:
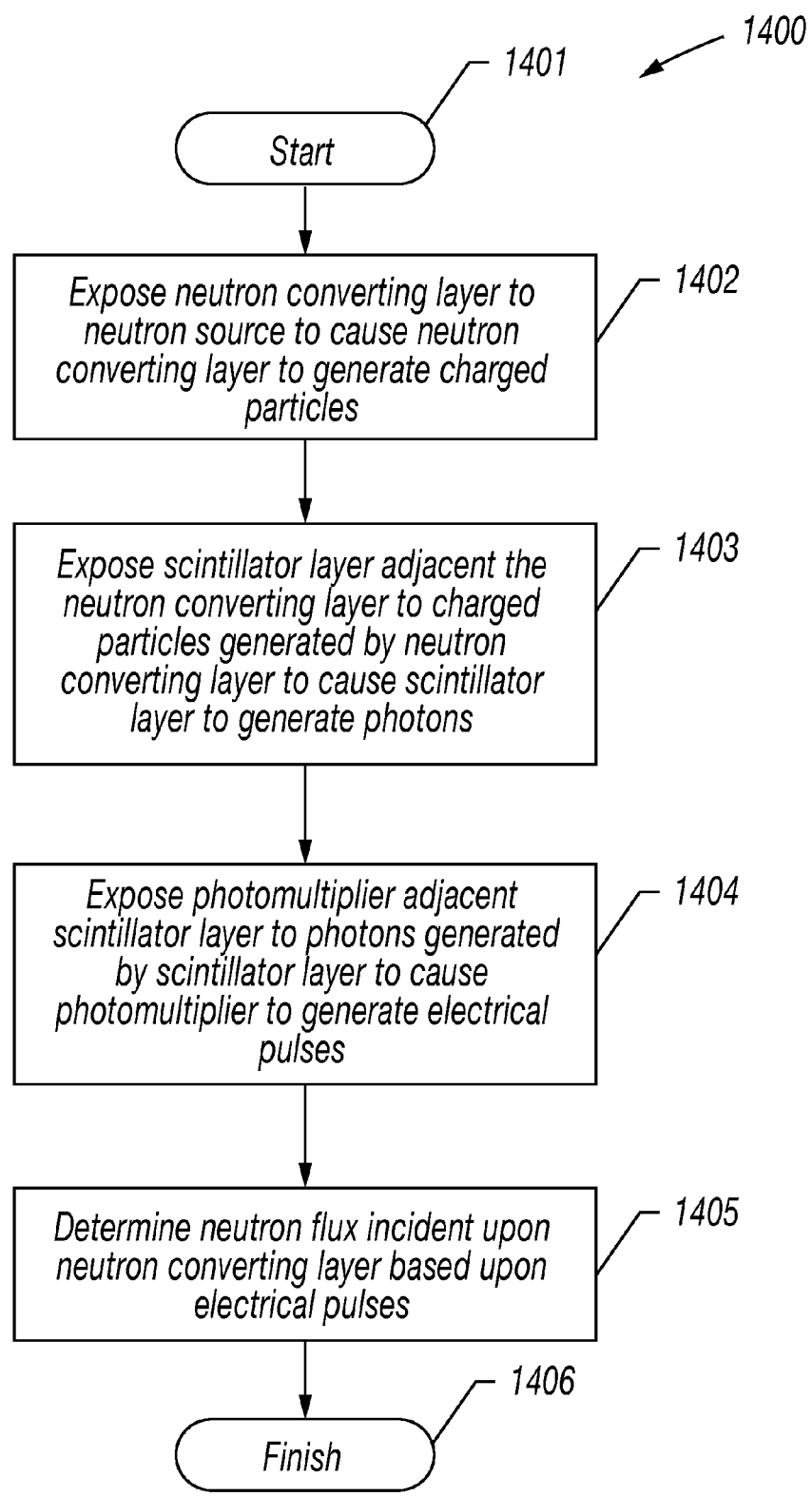
FIG. 14 is a flow diagram illustrating method aspects associated with the neutron detectors of FIGS. 9-10 and 12-13.
Figure 15:
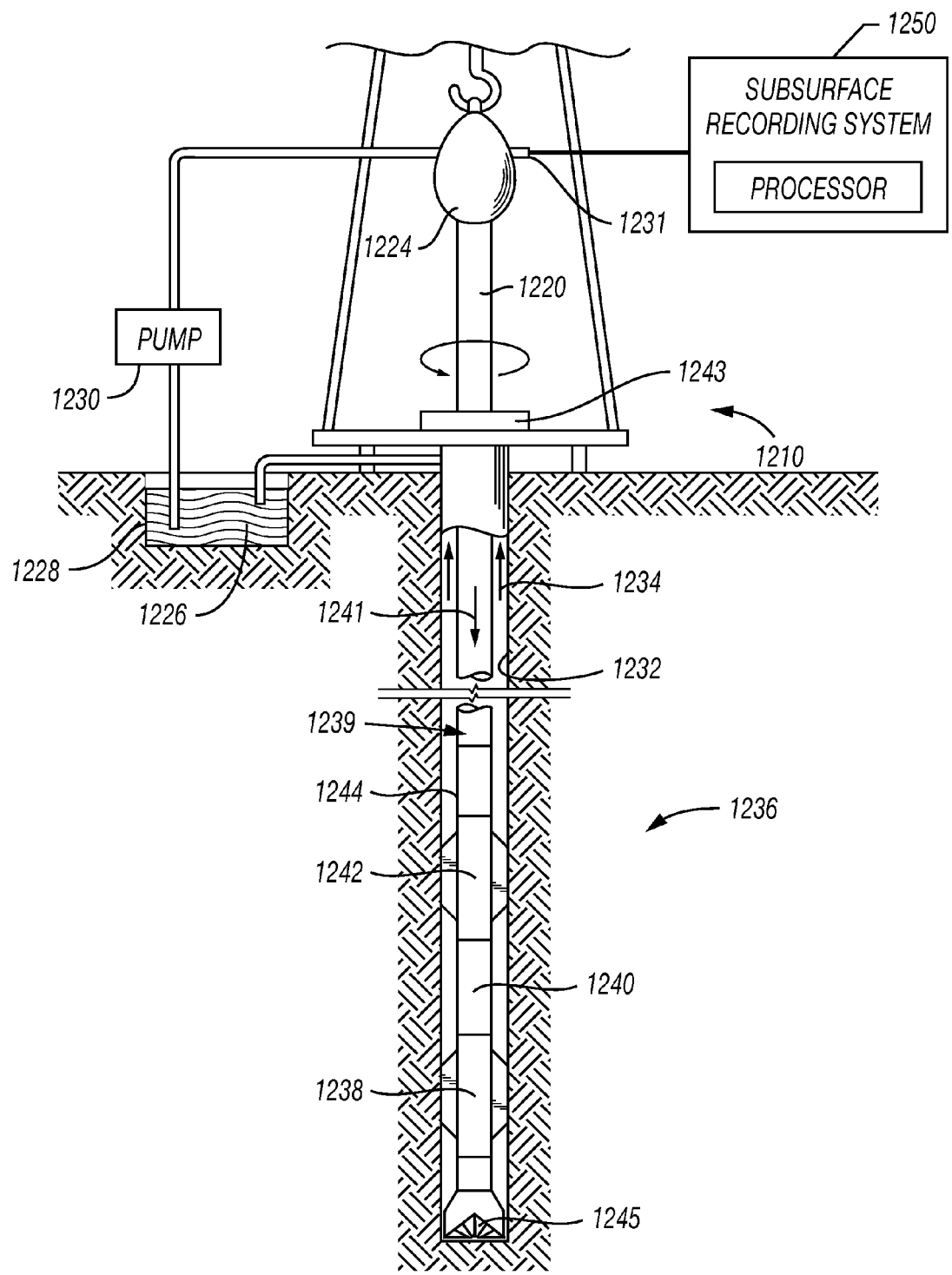
FIG. 15 is a schematic diagram illustrating a wellbore logging while drilling (LWD) system in which the various neutron detector embodiments may be used.

Turning to FIGS. 9-10 and 14, another example neutron detector 900 and related method aspects are now described. The neutron detector 900 illustratively includes a neutron converting layer or film 901, a scintillator layer or film 902 adjacent the neutron converting layer, and a photomultiplier 907 adjacent the scintillator layer. The photomultiplier 907 illustratively includes a photocathode 903, a series of dynodes 904 adjacent the photocathode, and an anode 905 adjacent a last one of the series of dynodes, as described further above.

Beginning at Block 1401 of the flow diagram 1400 of FIG. 14, the neutron converting layer 901 of the neutron detector 900 is exposed to a neutron source (e.g., in a wellbore, etc.) and generates gamma rays and electrons, at Block 1402. As the scintillator layer 902 is exposed to these charged particles, the scintillator layer in turn generates optical photons, at Block 1403. Upon exposure to the photomultiplier 907 (Block 1404), the photons cause the photocathode 903 to generate low energy electrons, and these electrons are multiplied in the stages of dynodes 904, as described above. The resulting anode current is larger than the charge produced by the neutron conversion film. The electrical charge pulses from the anode 905 may be processed to determine a neutron flux incident upon the neutron converting layer 901, at Block 1405, which concludes the method illustrated in FIG. 14 (Block 1406). More particularly, pulse processing electronics and counting electronics may be used to determine a count rate that is proportional to the neutron flux incident on the neutron-reacting material, for example.

In the configuration illustrated in FIGS. 9 and 10, the neutron converting film 901 defines a "window" for the neutron detector 900, and is positioned on an outside end of the neutron detector opposite the anode 905. The neutron converting film 901 includes a material having a relatively high neutron absorption cross section. The scintillator film 902 and photocathode 903 are incorporated within the vacuum tube housing of the photomultiplier 907. The series of multiplying dynodes 904 may be installed after the photocathode to amplify the electronic signal coming to the anode 906, as noted above. A shield 906 is included on the outside of the vacuum tube. The shield may include a material providing high gamma ray absorption to protect the inner components of the photomultiplier 907 from the gamma radiation for example, which may otherwise cause a "parasite" signal at the anode.

During operation, incident neutrons hit the neutron converting layer 901. The scintillator film 902 converts the electrons generated by the neutron converting layer 901, and potentially some of the low energy gamma rays, to light (i.e., optical photons) that enter the photocathode 903. The electrons created at the photocathode 903 are amplified by the dynodes 904 to provide the resultant current in the anode 905.

Materials such as Gadolinium (Gd), Boron (B), Lithium (Li), and Cadmium (Cd), for example, have a relatively high cross section of neutron absorption and may be used for the neutron converting layer 901, as noted above. Among these materials, natural Gd contains 15.7% of Gd 157 with a 255000 barn neutron cross section. In addition to Gd 157, radionuclide Gd 155 has a cross section of 61000 barns (the concentration in natural Gd is 14.7%). After neutron capture, Gd nuclei emit gamma rays (for Gd 157 the energies are listed in the table I below), as well as conversion and Auger electrons (see table 2 below, also for Gd 157).

TABLE 1

Gamma rays emitted after neutron capture by Gd 157

| Isotope | Energy, keV | Intensity (per 100 neutrons) |
| --- | --- | --- |
| 157Gd | 79.51 | 77.3 (19) |
| 157Gd | 135.26 | 0.73 (8) |
| 157Gd | 181.931 | 139 (6) |
| 157Gd | 212.97 | 0.21 (13) |
| 157Gd | 218.225 | 1.06 (8) |
| 157Gd | 230.23 | 0.385 (21) |
| 157Gd | 255.654 | 6.7 (4) |
| 157Gd | 277.544 | 9.50 (23) |
| 157Gd | 365 | 1.14 (10) |
| 157Gd | 780.14 | 19.5 (4) |
| 157Gd | 944.09 | 59.5 (13) |
| 157Gd | 960 | 39.5 (25) |
| 157Gd | 975 | 27.8 (4) |

TABLE 2

Conversion and Auger electrons (most intensive lines only) created in neutron capture reaction

| Electron Energy, keV | Electron output per 100 neutrons | Free path in Gd, um |
| --- | --- | --- |
| 293 | 35.58 | 4.7 |
| 34.9 | 7.9 | 6.29 |
| 71.7 | 5.57 | 20.7 |
| 78 | 1.2 | 23.78 |
| 131.7 | 6.96 | 55.7 |
| 174.1 | 0.99 | 86.27 |
| 180.4 | 0.21 | 91.23 |
| 205.4 | 0.14 | 111.47 |
| 227.3 | 0.16 | 130.27 |
| 729.9 | 0.03 | 649.38 |
| 893.85 | 0.06 | 830.05 |
| 911.8 | 0.04 | 849.83 |
| 926.8 | 0.03 | 866.35 |

To provide desired efficiency of neutron conversion, by way of example, a Gd film thickness may be on the order of (or bigger than):

$$d \sim \frac{1}{n\sigma} = \frac{A}{N_A \rho \sigma} = 6.75 \, \mu m,$$

where d is the film thickness, n is atoms concentration (1/cm$^3$), σ is cross section of neutrons absorption, $N_A$ is Avogadro's number, and ρ is density. For electrons with the energy 20-100 keV, the free path in gadolinium is less than or equal to 50 μm. The thickness of the Gd foil used for desired neutron detection efficiency may depend on the type of Gd used (e.g., natural or enriched), but generally speaking this may be around 5 μm, and may provide an efficiency of about 10%. In addition to the converted electrons, the gamma rays with energy 79.1 keV and higher will be emitted from a Gd film.

In the present embodiment, material used for the scintillator layer 902 may be a crystal that is compatible with vacuum conditions and with materials contained in the photocathode. Crystals that are not necessarily compatible may also be used, but it may be desirable to position an additional window between the scintillator material the photocathode 903, which may decrease the efficiency to some degree. One example crystal material that has suitable compatibility for inclusion in the photomultiplier 907 is YAP (e.g., YAlO$_3$, density 5.38 g/cm3). Another scintillator material that may provide desired operating characteristics and compatibility for use inside the vacuum tube is LuAP.

Compared to gamma rays, electrons may be detected with a relatively thinner film of scintillator crystal materials. For the electrons with energies below 70 keV, the absorption range is within 20 μm for typical densities of 5 g/cm$^3$. A scintillator film 902 having a thickness of about 100 μm (0.1 mm) allows for detection of most electrons, with a relatively small gamma ray absorption.

It should be mentioned that the gamma rays from neutron absorption in Gd (see table 1 above) may be detected in the scintillator film 902, although with a relatively low probability due to the small crystal volume. For example, the gamma rays with the energy 79.51 keV have a photoelectric absorption of 0.76 cm$^2$/g and the full absorption peak for these energies is about 4% per one gamma ray (3% per one incident neutron). One may consider using the count rate in this peak as a neutron flux signal, although this peak may not be well resolved from the fluorescent peak from tungsten (69.5 keV), and these gamma rays will be present due to both neutron components (excited by one of the gamma rays from table 1) and external gamma components which have energy higher than 69.5 keV.

As such, detection of 79.51 keV gamma rays may be excluded if tungsten is used as a gamma ray shield 906. However, other materials may be used as a shield 906 and this would allow utilization of the 79.51 keV peak. Tungsten 69.5 keV fluorescent x-rays may be used to calibrate the energy response of the scintillator layer 902. An example window for the neutron signal detection is 20-40 keV, at which the gamma rays from the incident neutron will provide a relatively smaller contribution to the useful signal than the electrons. However, other configurations may also be used.

The photocathode 903 quantum efficiency may be compatible with the scintillator crystal emission spectrum to provide desired energy resolution. The multiplying dynodes 904 may have different structures and numbers of stages, as discussed further above.

The signal (anode current) will include one component caused by the neutrons, and another caused by the parasite gamma rays passing through the gamma absorbing shield material (e.g., tungsten, lead, or other material with a relatively high impedance (Z) and density). Most of these gamma rays will have a relatively high energy. Moreover, the scintillator film 902 mostly absorbs low energy gamma rays. Those gamma rays that are not absorbed by the shield 906 and which interact with the scintillator crystal layer 902 may be filtered if this signal is located in another energy range than the useful signal from the neutrons.

Figure 11:
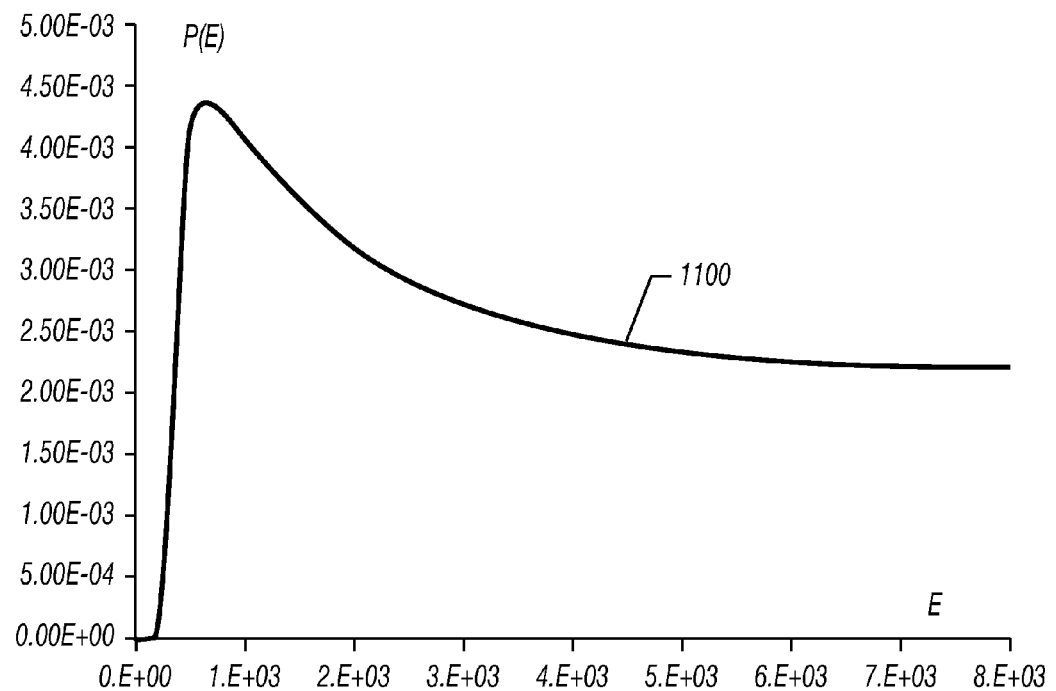
FIG. 11 is a graph illustrating a probability of gamma ray detection associated with the neutron detector of FIG. 9.

To estimate the gamma ray sensitivity, consider the incident gamma ray coming to the neutron detector 900 with an angle θ to the axis of symmetry. Then, the probability of gamma rays to be detected may be written as:

$$p(E) = \exp\left(-\left(\frac{\mu}{\rho}\right)_w \rho_w \frac{d}{\sin\theta}\right) \cdot \left[1 - \exp\left(-\left(\frac{\mu}{\rho}\right)_c \rho_c \frac{t}{\cos\theta}\right)\right]$$

where W is tungsten, C is crystal, and t is a crystal film thickness. To estimate a "worst case" scenario, the total mass attenuation coefficient for the scintillator crystal layer 901 and mass photoelectric absorption for the tungsten shield 906 alone is used (as scattered gamma rays may still give a parasite signal in the crystal). Using mass attenuation values, the resulting dependence is shown in a plot 1100 of the graph of FIG. 11 for an example tungsten shield 906 thickness of 3 mm, a scintillator film 902 thickness of 0.1 mm, and an angle θ of 45 degrees).

Gamma rays with very high energy (e.g., 500 keV) may be omitted from the total signal consideration, as there is little useful signal in this energy region. At energy values of interest for the neutron signal detection (e.g., energies of 30-60 keV, before the window around 69.5 keV, such as 65-75 keV) little external gamma ray detection is expected (even at 150 keV energy detection probability is around $2\times10^{-7}$). A relatively small contribution may come from gamma rays scattered several times inside the photomultiplier 907 (e.g., in the shield 906, neutron converting film 901, etc.), which may be relatively insignificant compared to the neutron signal with around 10% detection efficiency.

Various alternative embodiments of the neutron detector 900 may be used. For example, other elements besides Gd may be used for the neutron converting entrance window, such as Boron, Lithium, Cadmium, etc., as noted above. Moreover, enriched Gd 157 may be used instead of natural Gd.

Figure 12:
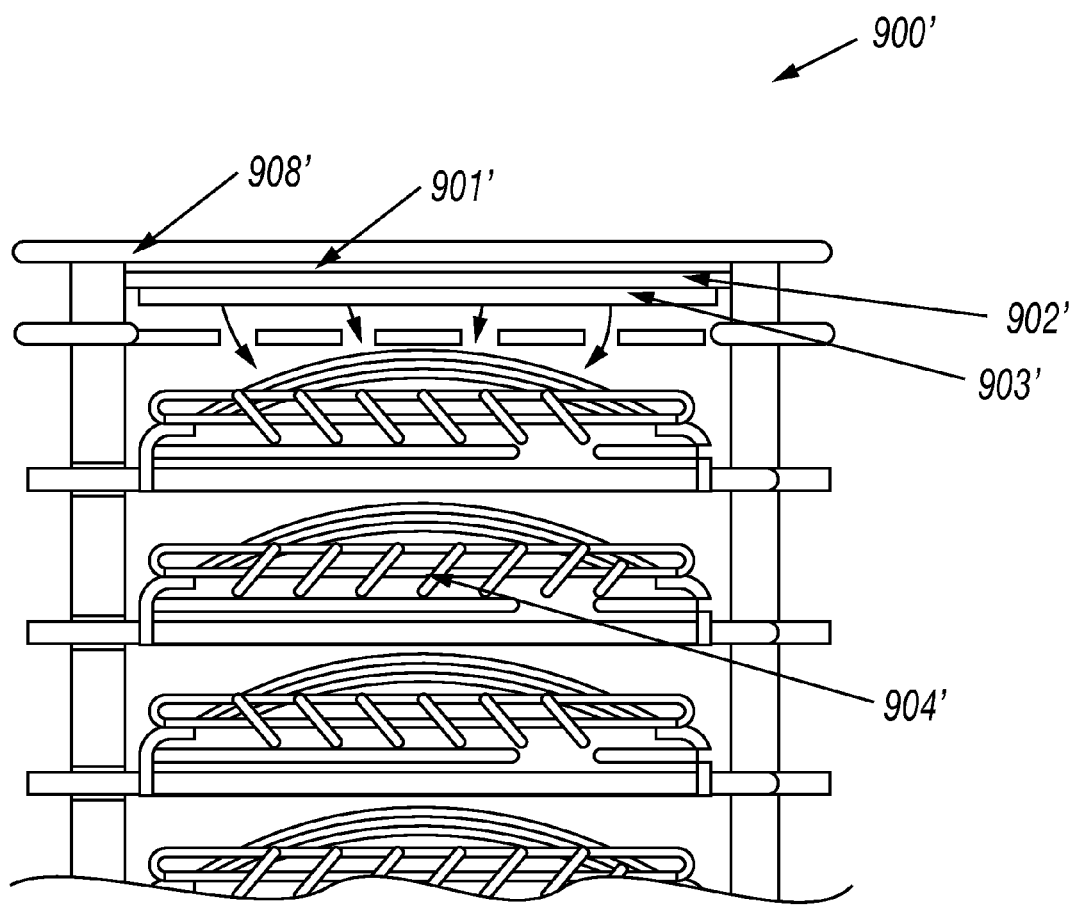
FIG. 12 is a schematic cross-sectional diagram of another embodiment of the neutron detector of FIG. 9 in which the neutron converting layer is included within the vacuum tube housing of the photomultiplier.

In another example embodiment of the neutron detector 900' shown in FIG. 12, the neutron converting film 901' and scintillator film 902' are vacuumized (i.e., included within the photomultiplier vacuum tube), and a separate entrance window or layer 908' including a neutron transparent material (e.g., natural zirconium, etc.) is positioned on the outside end of the vacuum tube.

Figure 13:
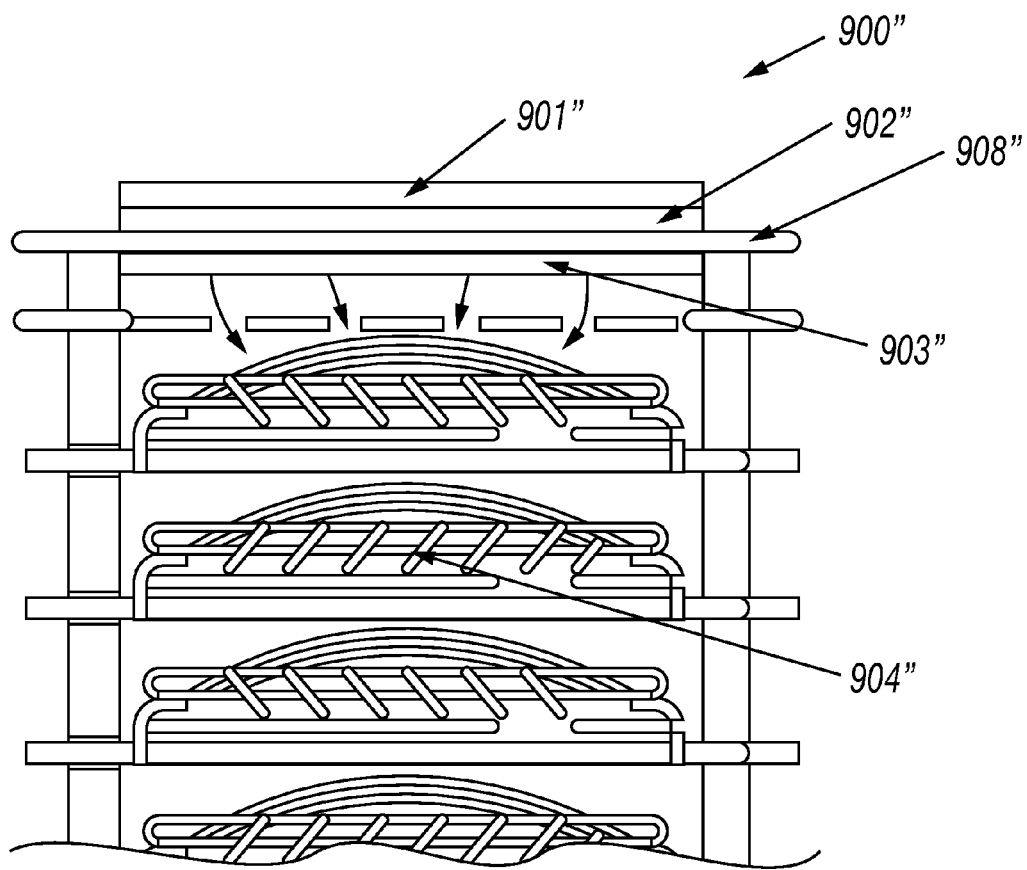
FIG. 13 is a schematic cross-sectional diagram of still another embodiment of the neutron detector of FIG. 9 in which the neutron converting layer and scintillator layer are positioned outside of the vacuum tube housing of the photomultiplier.

In still another example embodiment of the neutron detector 900" shown in FIG. 13, the neutron converting layer 901 and the scintillator film 902 may be positioned on the entrance window 908" opposite the photocathode 903", i.e., outside of the vacuum tube. Since the scintillator film 902" is outside of the vacuum tube and incompatibility with the photocathode material is accordingly not an issue, additional scintillator crystal materials such as NaI, LaBr$_3$, LaCl$_3$, etc., may be used in addition to those noted above.

Referring additionally to FIG. 14, one example application for which the above-described neutron detectors may advantageously be used is for well-logging, such as for hydrocarbon resource (e.g., oil, natural gas, etc.) wells. The example shown in FIG. 14 is for a logging while drilling (LWD) or measurement while drilling (MWD) implementation, but it will be appreciated that the neutron detectors described herein may also be used in a wireline or other configuration as well in other embodiments. In the illustrated embodiment, an example configuration for acquiring well log data using an LWD/MWD system 1239 is shown. The LWD/MWD system 1239 illustratively includes one or more collar sections 1244, 1242, 1240, 1238 coupled to the lower end of a drill pipe 1220. The LWD/MWD system 1239 includes a drill bit 1245 at the bottom end to drill the wellbore 1232 through the earth 1236. In this example, drilling is performed by rotating the drill pipe 1220 using a rotary table 1243. However, drilling may also be performed by top drives and coiled tubing drilling with downhole motors, for example. During rotation, the pipe 1220 is suspended by equipment on a drill rig 1210 including a swivel 1224, which enables the pipe 1220 to rotate while maintaining a fluid tight seal between the interior and exterior of the pipe 1220. Mud pumps 1230 draw drilling fluid ("mud") 1226 from a tank or pit 1228 and pump the mud 1226 through the interior of the pipe 1220, down through the LWD/MWD system 1239, as indicated by arrow 1241. The mud 1226 passes through orifices (not shown) in the bit 1245 to lubricate and cool the bit 1245, and to lift drill cuttings in through an annulus 1234 between the pipe 1220, LWD/MWD system 1239, and the wellbore 1232.

The collar sections 1244, 1242, 1240, 1238 include sensors (not shown) therein which make measurements of various properties of the earth formations 1236 through which the wellbore 1232 is drilled. These measurements may be recorded in a recording device disposed in one or more of the collar sections 1244, 1242, 1240, 1238, or communicated to a surface recording system 1251 outside of the well. For example, MWD systems may also provide the telemetry (communication system) for any MWD/LWD tool sensors in the drill string.

Example LWD systems include one or more sensors which measure formation properties such as density, resistivity, gamma rays, etc. The above-described neutron detectors may be incorporated as sensors to measure neutron porosity, for example, as described above. Other sensors may also be included to measure selected drilling parameters, such as inclination and azimuth trajectory of the wellbore 1232, for example. Additional drilling sensors may include a sensor for measuring axial force (weight) applied to the LWD/MWD system 1239, and shock and vibration sensors.

The LWD/MWD system 1239 may further include a mud pressure modulator (not shown separately) in one of the collar sections (e.g., the collar section 1244). The modulator applies a telemetry signal to the flow of mud 1226 inside the system 1239 and pipe 1220 where the telemetry signal is detected by a pressure sensor 1231 disposed in the mud flow system. The pressure sensor 1231 is coupled to detection equipment in a surface recording system 1250, which enables recovery and recording of information transmitted in the telemetry scheme sent by the MWD portion of the LWD/MWD system 1239. The telemetry scheme includes a subset of measurements made by the various sensors in the LWD/MWD system 1239. The telemetry of the logging tools may also be determined using a wireline cable, or electrical MWD telemetry (e.g., using electrical signals transmitted through the formation). Measurements made by the various sensors in the LWD/MWD system 1239 may also be transferred to the surface recording system 1250 when the LWD/MWD system 1239 is withdrawn from the wellbore.

By way of example, the surface recording system 1251 may include a processor 1251, which cooperates with the neutron detector of the LWD/MWD system 1239 to determine a neutron flux incident upon said neutron converting layer, as described above. This, in turn, advantageously provides an indication of the neutron porosity of the earth 1236 in the vicinity of the drill head 1245. By way of example, the processor 1251 may be implemented using a combination of hardware (e.g., microprocessor, etc.), and a non-transitory computer-readable medium having computer executable instructions for performing the various operations noted herein.

Many modifications and other embodiments will come to the mind of one skilled in the art having the benefit of the teachings presented in the foregoing descriptions and the associated drawings. Therefore, it is understood that various That which is claimed is:

1. A neutron detector comprising:
a neutron converting layer;
a scintillator layer adjacent said neutron converting layer; and
a photomultiplier adjacent said scintillator layer, and comprising a vacuum tube including an entrance window comprising a neutron transparent material, and a photocathode layer within said vacuum tube adjacent said entrance window;
wherein said neutron converting layer and scintillator layer are within said vacuum tube adjacent said entrance window.

2. The neutron detector of claim 1 wherein said neutron converting layer comprises at least one of Boron, Lithium, Cadmium and Gadolinium.

3. The neutron detector of claim 1 wherein said scintillator layer comprises at least one of $YAlO_3$, NaI, $LaBr_3$, and $LaCl_3$.

4. The neutron detector of claim 1 wherein said photomultiplier comprises a series of dynodes, and an anode adjacent a last one of said series of dynodes.

5. A well logging apparatus comprising:
a well logging tool to be conveyed within a wellbore of a subterranean formation comprising a neutron converting layer,
a scintillator layer adjacent said neutron converting layer, and a photomultiplier adjacent said scintillator layer, wherein said photomultiplier comprises a vacuum tube including an entrance window comprising a neutron transparent material, and a photocathode layer within said vacuum tube adjacent said entrance window, and wherein said neutron converting layer and scintillator layer are within said vacuum tube adjacent said entrance window; and
a processor coupled to said well logging tool.

6. The well logging apparatus of claim 5 wherein said processor cooperates with said well logging tool to determine a neutron flux incident upon said neutron converting layer.

7. A neutron detection method comprising:
exposing a neutron converting layer to a neutron source to cause the neutron converting layer to generate charged particles;
exposing a scintillator layer adjacent the neutron converting layer to the charged particles generated by the neutron converting layer to cause the scintillator layer to generate photons;
exposing a photomultiplier adjacent the scintillator layer to the photons generated by the scintillator layer to cause the photomultiplier to generate electrical pulses, wherein the photomultiplier comprises a vacuum tube including an entrance window comprising a neutron transparent material, and a photocathode layer within the vacuum tube adjacent the entrance window, and wherein the neutron converting layer and scintillator layer are within the vacuum tube adjacent the entrance window; and
determining a neutron flux incident upon the neutron converting layer based upon the electrical pulses.

* * * * *